(12) United States Patent
Zhao et al.

(10) Patent No.: US 9,985,438 B2
(45) Date of Patent: May 29, 2018

(54) OPTIMIZATION METHOD FOR INDEPENDENT MICRO-GRID SYSTEM

(71) Applicants: Electric Power Research Institute of State Grid Zhejiang Electric Power Company, Hangzhou, Zhejiang (CN); State Grid Corporation of China (SGCC), Beijing (CN)

(72) Inventors: Bo Zhao, Zhejiang (CN); Jian Chen, Zhejiang (CN); Xuesong Zhang, Zhejiang (CN); Jinhui Zhou, Zhejiang (CN); Xiaohui Ge, Zhejiang (CN); Peng Li, Zhejiang (CN)

(73) Assignees: Electric Power Research Institute of State Grid Zhejiang Electric Power Company, Hangzhou, Zhejiang (CN); State Grid Corporation of China (SGCC), Beijing (CN)

( * ) Notice: Subject to any disclaimer, the term of this patent is extended or adjusted under 35 U.S.C. 154(b) by 309 days.

(21) Appl. No.: 14/779,951

(22) PCT Filed: Oct. 14, 2013

(86) PCT No.: PCT/CN2013/085158
§ 371 (c)(1),
(2) Date: Sep. 24, 2015

(87) PCT Pub. No.: WO2014/153946
PCT Pub. Date: Oct. 2, 2014

(65) Prior Publication Data
US 2016/0064934 A1    Mar. 3, 2016

(30) Foreign Application Priority Data

Mar. 27, 2013  (CN) .......................... 2013 1 0103553

(51) Int. Cl.
*G05D 9/00*      (2006.01)
*H02J 3/32*      (2006.01)
(Continued)

(52) U.S. Cl.
CPC .................. *H02J 3/32* (2013.01); *H02J 3/38* (2013.01); *G05B 13/042* (2013.01); *G06N 3/126* (2013.01);
(Continued)

(58) Field of Classification Search
CPC .. G06Q 50/06; H02J 3/32; H02J 3/008; Y02E 10/566; Y02E 70/30; Y02E 10/563; Y02E 10/763; G05B 13/026
See application file for complete search history.

(56) References Cited

U.S. PATENT DOCUMENTS

2010/0274407 A1    10/2010  Creed
2011/0208365 A1*   8/2011   Miller .................... G06Q 50/06
                                                              700/291
(Continued)

FOREIGN PATENT DOCUMENTS

CN    102184475 A    9/2001
CN    102354334 A    2/2012
(Continued)

OTHER PUBLICATIONS

International Search Report issued by the State Intellectual Property Office of the P.R. China, dated Dec. 27, 2013 (in Chinese language) for related International Application No. PCT/CN2013/085158; 4 pages.

(Continued)

*Primary Examiner* — Tuan Vu
(74) *Attorney, Agent, or Firm* — Faegre Baker Daniels LLP

(57) ABSTRACT

The present application discloses a method for optimized design of an independent micro-grid system, the independent micro-grid system comprising diesel generators, wind powered generators, a photovoltaic array, and an energy storage battery, the optimization method referring specifically to a multi-objective optimization design model based on the independent micro-grid system. In terms of the optimization planning design model, the method takes into account a combined start-up mode for a plurality of diesel generators and a control strategy for coordinating between the energy storage battery and the diesel generators, such that the usage rate of renewable energy in the independent micro-grid is higher, and operations more economical and environmentally friendly. Regarding the stability of the (Continued)

system optimization planning design model, the method takes into account the reserve capacity needed for stability of the independent micro-grid. In terms of the solving algorithm of the optimization planning design model, the method employs a multi-objective genetic algorithm based on NSGA-II to implement multi-objective problem-solving, thereby allowing a multi-objective optimization of the three major objectives of economy, reliability, and environmental friendliness of an independent micro-grid system.

7 Claims, 3 Drawing Sheets

(51) Int. Cl.
      *H02J 3/38*     (2006.01)
      *G05B 13/04*    (2006.01)
      *G06N 3/12*     (2006.01)
(52) U.S. Cl.
      CPC .......... *Y02E 10/563* (2013.01); *Y02E 10/566* (2013.01); *Y02E 70/30* (2013.01); *Y02P 80/14* (2015.11)

(56) References Cited

U.S. PATENT DOCUMENTS

| 2014/0094980 | A1* | 4/2014 | Saito | G05B 13/026 700/291 |
|---|---|---|---|---|
| 2015/0277410 | A1* | 10/2015 | Gupta | H02J 3/008 700/295 |

FOREIGN PATENT DOCUMENTS

| CN | 102593874 A | 7/2012 |
|---|---|---|
| CN | 102694391 A | 9/2012 |
| CN | 102904289 A | 1/2013 |
| CN | 103151798 A | 6/2013 |

OTHER PUBLICATIONS

International Search Report issued by the State Intellectual Property Office of the P.R. China, dated Dec. 27, 2013 (translated to English language) for related International Application No. PCT/CN2013/085158; 4 pages.

Written Opinion (Chinese language) from the International Searching Authority, The State Intellectual Property Office, the P.R. China, dated Jan. 16, 2014, for International Application No. PCT/CN2013/085158; 5 pages.

English translation of the Written Opinion from the International Searching Authority, The State Intellectual Property Office, the P.R. China, dated Jan. 16, 2014, for International Application No. PCT/CN2013/085158; 6 pages.

Liu, Mengxaun et al., "An Optimal Design Method of Multi-objective Based Island Microgrid," 1994-2012 China Academic Journal Electronic Publishing House, pp. 34-37, vol. 36, No. 17, Sep. 10, 2012; 6 pages.

Liu, Mengxaun et al., "A Coordinated Operating Control Strategy for Hybrid Isolated Microgrid Including Wind Power, Photovoltaic System, Diesel Generator, and Battery Storage," 1994-2012 China Academic Journal Electronic Publishing House, pp. 19-20, vol. 36, No. 15, Aug. 10, 2012; 6 pages.

\* cited by examiner

OPTIMIZATION METHOD FOR INDEPENDENT MICRO-GRID SYSTEM

CROSS REFERENCE OF RELATED APPLICATION

This present application is a national phase of International Application No. PCT/CN2013/085158, titled "OPTIMIZATION METHOD FOR INDEPENDENT MICRO-GRID SYSTEM", filed on Oct. 14, 2013, which claims the priority to Chinese Patent Application No. 201310103553.5, titled "OPTIMIZATION METHOD FOR INDEPENDENT MICRO-GRID SYSTEM", filed on Mar. 27, 2013 with the State Intellectual Property Office of China, which are both incorporated herein by reference in their entireties.

FIELD

The present disclosure relates to the technical field of independent micro-grid systems, and in particular to a method for optimizing an independent micro-grid system.

BACKGROUND

An independent micro-grid system indicates a small power system that is isolated from a large power grid and operates independently to mainly supply power for remote areas or islands. The independent micro-grid system makes good use of renewable energy. The independent micro-grid system may combine various kinds of distributed generation units such as a photovoltaic array and wind generators, so that advantages of a single energy system and also complementation of various kinds of energy can be achieved, efficiency and energy utilization of the entire independent micro-grid system are improved, and the costs are lower and the reliability of power supplying is higher, as compared with a condition of a single optical storage system or wind storage system.

To carry out an optimizing planning design of the independent micro-grid system, it needs to take full consideration of a combination solution and an operation control strategy of the distributed generation units in the independent micro-grid system. In conventional research, a quasi-steady state hourly simulation optimizing design method based on meteorological data and load data is often adopted, i.e., various indices of the system under various types of renewable energy combination solutions are calculated by using a quasi-steady state simulation program based on obtained original data such as a wind speed, an light intensity, a temperature and a load of the system during a total life cycle. According to this method, variations of renewable energy resources and the load during the total life cycle, and the operation control strategy of the independent micro-grid system can be simulated in detail during optimizing planning, but a lot of time is consumed for calculation during the simulation. In terms of the optimization algorithm, since the optimizing is hybrid optimizing planning including discrete variables and continuous variables, the optimization is generally solved by adopting an artificial intelligence algorithm. In the optimizing planning, it is generally expected that multiple index constraints can be met simultaneously. However, in practice, various objects conflict in the multiple-objective optimizing. In optimizing planning design, a configured capacity of a diesel generator and a combined start-up mode of multiple devices directly affect technical and economic indices of the whole system. Such a problem is usually simplified in the conventional method for optimizing an independent micro-grid system. Usually, merely total power of a diesel generator group is optimized and designed, while types of the diesel generators and a multi-device combination solution are not considered. And when variables are optimized, types and capacities of the devices are not optimized simultaneously.

SUMMARY

To address the above technical problems, a method for optimizing an independent micro-grid system is provided according to embodiments of the present disclosure, to achieve low costs and high reliability of multi-objective optimizing design of the independent micro-grid system and a high utilization rate of renewable energy resources. Technical solutions are described as follows.

A method for optimizing an independent micro-grid system is provided according to the present disclosure, where the independent micro-grid system includes at least at least diesel generators, wind generators, a photovoltaic array and an energy storage battery, and the method includes:

obtaining device parameters of the diesel generators, the wind generators, the photovoltaic array and the energy storage battery; and performing genetic algorithm solving and optimization by adopting a multi-objective genetic algorithm based on the device parameters of the diesel generators, the wind generators, the photovoltaic array and the energy storage battery, where a quasi-steady state simulation strategy is adopted in the calculation, a preset spare capacity is reserved for the independent micro-grid system, optimization indices of the independent micro-grid system are obtained, and an optimization result is obtained by using the multi-objective genetic algorithm;

where the optimization indices of the independent micro-grid system include a present value of a total cost during a total life cycle, a loss of capacity of a load, and a pollution level; where the present value of the total cost during the total life cycle includes present values of costs for all the devices in the independent micro-grid system during a whole project service life and present values of salvages of all the devices in the independent micro-grid system; the loss of capacity of a load is a ratio of capacity shortage to a whole load capacity required; and the pollution level is an annual amount of various pollutants discharged; and the quasi-steady state simulation strategy includes a hard charging strategy and a power smooth strategy, where in the hard charging strategy, the diesel generators and the energy storage battery alternately function as a main power supply for meeting a requirement of a net load, and the diesel generators are permitted to charge the energy storage battery; and in the power smooth strategy, the energy storage battery merely functions as a supplementary power supply and discharges when the diesel generators alone are unable to meet the requirement of the load.

Optionally, the reserving a preset spare capacity for the independent micro-grid system includes: in an optimizing planning design model of the independent micro-grid system, using the diesel generators and the energy storage battery as a main power supply to maintain a voltage and a frequency stable, and reserving a preset spare capacity according to actual powers of the wind generators, the photovoltaic array and the load in real time.

Optionally, an NSGA-II multi-objective genetic algorithm is adopted during the genetic algorithm solving, and types of the wind generators, the number of the wind generators, types of the diesel generators, the number of the diesel generators, a capacity of the photovoltaic array, a type of the energy storage battery, the number of parallel branches of the energy storage battery, and a capacity of a bidirectional converter of the energy storage battery in the independent micro-grid system are selected as optimization variables.

Optionally, the obtaining a present value of a total cost during a total life cycle, a loss of capacity of a load, and a pollution level of the independent micro-grid system includes:

by taking an hour as a simulation step, performing quasi-steady state simulation during the total life cycle on each device in the independent micro-grid system, based on wind resources, light resources and a load requirement within a region where the independent micro-grid system is located; determining, based on a preset control strategy, the number and fuel consumption of the diesel generators in use, a charging power, a discharging power and a residual capacity of the energy storage battery in each time step, and capacity shortage y and a wasted power in the time step; and calculating a present value of a total cost during a total life cycle, a loss of capacity of a load, and a pollution level.

Optionally, the hard charging strategy includes:

calculating a net load of the independent micro-grid system and a net load when considering the spare capacity, where the net load is obtained by subtracting powers generated by the wind generators and the photovoltaic array from the load power;

determining the number of the diesel generators to operate in a present time step and calculating capacity shortage under a present load, according to the net load when considering the spare capacity under consideration, a condition of the diesel generators started up in a previous time step and a maximum charging power and a maximum discharging power of the energy storage battery; and after the number of the diesel generators to operate in the present time step is determined, calculating, based on the net load, actual fuel consumption of the diesel generators, a charging capacity and a discharging capacity of the energy storage battery, capacity shortage and a wasted energy in the present time step.

Optionally, the determining the number of the diesel generators to operate in a present time step and calculating capacity shortage under a present load includes:

permitting all the diesel generators meeting a minimum operation time requirement to stop operating, in a case that a total power of the diesel generators not reaching a minimum number of operation hours is able to meet the net load when considering the spare capacity and a charging requirement of the energy storage battery; otherwise, stopping operation of the diesel generators reaching the minimum operation time requirement one by one until the diesel generators in use are just able to meet the net load when considering the spare capacity and the charging requirement of the energy storage battery;

putting more diesel generators one by one into use, in a case that the total power of the diesel generators not reaching the minimum number of operation hours is unable to meet the net load when considering the spare capacity and the charging requirement of the energy storage battery, and a total power of the operating diesel generators is unable to meet the net load when considering the spare capacity and the charging requirement of the energy storage battery, where the additional diesel generators put in operation do not charge the energy storage battery;

calculating capacity shortage if any, where the capacity shortage is capacity among the net load when considering the spare capacity that is still not met by a total power of all the diesel generators in use after the more diesel generators are put in use one by one;

compensating the capacity shortage by a power discharged by the energy storage battery; and calculating the capacity shortage under the present load and thereby calculating the loss of capacity of the load, in a case that a sum of the power discharged by the energy storage battery and a total power of all the diesel generators is still unable to meet the net load when considering the spare capacity.

Optionally, after the number of the diesel generators to be used in the present time step is determined, besides the calculating, based on the net load, actual fuel consumption of the diesel generators, a charging capacity and a discharging capacity of the energy storage battery, capacity shortage and a wasted energy in the present time step, the method further includes:

determining whether all the diesel generators in use meet both the net load and the charging requirement of the energy storage battery if all the generators operate at a minimum output power level; if yes, keeping all the diesel generators in use operating at the minimum output power level and calculating excess electric energy generated when all the diesel generators operate at the minimum output power level; if no, determining, based on the net load and the charging requirement of the energy storage battery, a total output power level of all the diesel generators;

permitting the energy storage battery to discharge and, together with the diesel generators, provide power to the load, in a case that all the diesel generators in rated operation are still unable to meet the net load; and calculating actual capacity shortage under a present load, in a case that after the energy storage battery discharges, a sum of the power discharged by the energy storage battery and the total power of the diesel generators are still unable to meet the net load.

Optionally, the power smooth strategy includes:

calculating a net load in a present time step, where the net load is obtained by subtracting powers generated by the wind generator and the photovoltaic array from a load power;

first using the energy storage battery to compensate a capacity shortage that is not met by the diesel generators, in a case that the net load is greater than zero and the diesel generators operate beyond an upper limit of a normal operation range;

putting more diesel generators in use one by one, in a case that the energy storage battery is unable to meet the capacity shortage or a capacity of the energy storage battery is lower than a lower limit capacity of the energy storage battery;

calculating an unmet load power as a load shortage power, in a case that the net load is still unable to be met after the more diesel generators are put in use one by one;

in a case that the net load is greater than zero and an output power level of a diesel generator is less than a minimum output power level, reducing the number of the diesel generators in use until operation of all the diesel generators returns to the normal operation range; in a case that the number of the diesel generators is reduced to one and the output power of the diesel generator is still less than the minimum output power level, discarding a part of generated power and taking the discarded generated power as a residual power, where the diesel generator do not charge the battery; and shutting down the diesel generators and charging the energy storage battery by the wind generator and/or the photovoltaic array, in a case that the net load is less than zero; and discarding a part of the output power of the wind generator and/or the photovoltaic array and calculating a residual power, in a case that a power for charging the energy storage battery exceeds a maximum charging power of the energy storage battery or the capacity of the energy storage battery reaches a maximum capacity.

According to the above technical solutions according to embodiments of the present disclosure, a method for optimizing an independent micro-grid system is provided, and the independent micro-grid system includes diesel generators, wind generators, a photovoltaic array and an energy storage battery. The optimization method is based on a multi-objective optimizing design model of the independent micro-grid system; and a combined start-up mode of multiple diesel generators and a coordination control strategy between the energy storage battery and the diesel generators are considered in optimizing the planning design model, so that renewable energy in the independent micro-grid system can be utilized at a higher utilization rate, and the operation is more economical and more environment-friendly. In terms of stability of the optimizing planning design model of the system, a spare capacity is considered for stability of the independent micro-grid system. In terms of a solving algorithm of the optimizing planning design model, the multi-objective problem solving is performed by adopting an NSGA-II multi-objective genetic algorithm, so that multi-objective optimization with respect to three objects, i.e., economy, reliability and environment-friendliness of the independent micro-grid system is achieved.

BRIEF DESCRIPTION OF THE DRAWINGS

Drawings for description of embodiments of the present disclosure or the conventional art will be described briefly as follows, so that the technical solutions according to the embodiments of the present disclosure or the conventional art will become clearer. Apparently, the drawings in the following description merely illustrate a few embodiments of the present disclosure. For those skilled in the art, other drawings may be obtained according to these drawings without any creative work.

DETAILED DESCRIPTION OF THE EMBODIMENTS

A method for optimizing an independent micro-grid system is provided according to embodiments of the present disclosure. The optimization method is based on a multi-objective optimizing design model of an independent micro-grid system. In terms of the optimizing the planning design model, a combined start-up mode of multiple diesel generators and a coordination control strategy among an energy storage battery and the diesel generators are considered; in terms of stability of the optimizing model, a spare capacity is considered for stability of the system; in terms of selecting optimization variables, types and installed capacities of devices in the independent micro-grid system are optimized simultaneously; and in terms of a solving algorithm of the optimizing model, multi-objective problem solving is performed by adopting an NSGA-II multi-objective genetic algorithm, so that multi-objective optimization with respect to three objects, i.e., economy, reliability and environment-friendliness of the independent micro-grid system is achieved.

To enable those skilled in the art to better understand technical solutions according to the present disclosure, the technical solutions according to the embodiments of the present disclosure will be described clearly and completely as follows in conjunction with the drawings of the embodiments of the present disclosure. Apparently, the described embodiments are merely a few embodiments of the present disclosure, but not all the embodiments. Any other embodiment obtained based on the embodiments of the present disclosure by those skilled in the art without creative work falls within the scope of the present disclosure.

Figure 1:
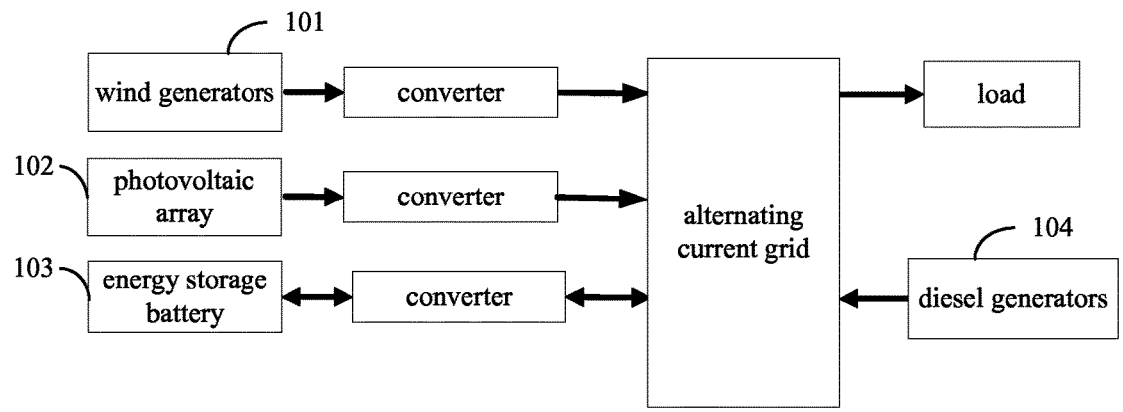
FIG. 1 is a schematic structural diagram of an independent micro-grid system according to an embodiment of the present disclosure.

Reference is made to FIG. 1, which shows a schematic structural diagram of an independent micro-grid system. The independent micro-grid system includes wind generators 101, a photovoltaic array 102, an energy storage battery 103 and diesel generators 104. The wind generators 101, the photovoltaic array 102 and the energy storage battery 103 are respectively connected into an alternating current grid system via converters, and the diesel generators adopt synchronous generators and are directly connected to the alternating current grid. In addition, the alternating current grid is connected to a load and supplies power to the load.

Figure 2:
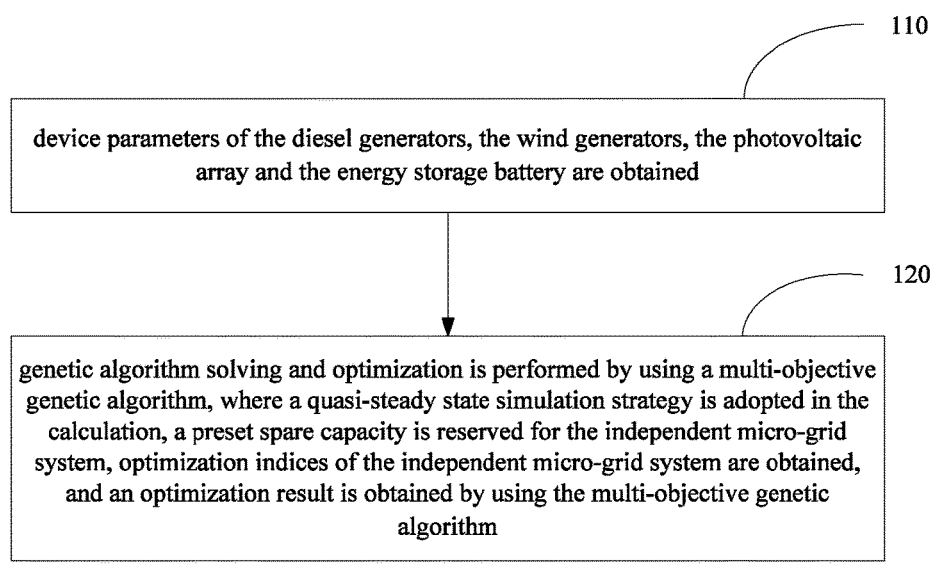
FIG. 2 is a schematic flowchart of a method for optimizing an independent micro-grid system according to an embodiment of the present disclosure.

Reference is made to FIG. 2, which shows a schematic flowchart of a method for optimizing an independent micro-grid system according to an embodiment of the present disclosure, and the method includes steps 110 to 120 as follows.

In step 110, device parameters of the diesel generators, the wind generators, the photovoltaic array and the energy storage battery are obtained.

In step 120, genetic algorithm solving and optimization is performed by using a multi-objective genetic algorithm, where a quasi-steady state simulation strategy is adopted in the calculation, a preset spare capacity is reserved for the independent micro-grid system, optimization indices of the independent micro-grid system are obtained, and an optimization result is obtained by using the multi-objective genetic algorithm.

The optimization indices of the independent micro-grid system include a present value of a total cost during a total life cycle, a loss of capacity of a load, and a pollution level.

The present value of the total cost during the total life cycle includes present values of costs of all the devices in the independent micro-grid system during a whole project service life and present values of salvages of all the devices in the independent micro-grid system. The loss of capacity of a load is a ratio of capacity shortage to a total load capacity required. The pollution level is an annual amount of various pollutants discharged.

The quasi-steady state simulation strategy includes a hard charging strategy and a power smooth strategy. In the hard charging strategy, the diesel generators and the energy storage battery alternately function as a main power supply for meeting a requirement of a net load, and the diesel generators are permitted to charge the energy storage battery. In the power smooth strategy, the energy storage battery merely functions as a supplementary power supply and discharges when the diesel generators alone are unable to meet the requirement of the load.

The method for optimizing the independent micro-grid system according to the embodiment of the present disclosure is applied to an independent micro-grid system including diesel generators, wind generators, a photovoltaic array and an energy storage battery. The optimization method is based on a multi-objective optimizing design model of the independent micro-grid system; and a combined start-up mode of multiple diesel generators and a coordination control strategy among the energy storage battery and the diesel generators are considered in optimizing the planning design model, so that renewable energy in the independent micro-grid system can be utilized at a higher utilization rate, and the operation is more economical and more environment-friendly. In terms of stability of the optimizing planning design model of the system, a spare capacity is considered for stability of the independent micro-grid system. In terms of a solving algorithm of the optimizing planning design model, a multi-objective problem solving is performed by adopting a multi-objective genetic algorithm, so that multi-objective optimization with respect to three objects, i.e., economy, reliability and environment-friendliness of the independent micro-grid system is achieved.

The optimization of the independent micro-grid system mainly relates to three optimization indices: a present value of a total cost during a total life cycle, a loss of capacity of a load, and a pollution level.

An objective function is represented by:

$$\text{Min}(f_i) \ i=1,2,3 \qquad (1)$$

The present value of a total cost during a total life cycle includes two parts, which are present values of costs of all the devices in the independent micro-grid system during a whole project service life and present values of salvages of all the devices in the independent micro-grid system, and a mathematical expression of the present value of a total cost during a total life cycle is:

$$f_1 = \sum_k^K \frac{C(k)}{(1+r)^k} - B_{salvage} \qquad (2)$$

Where, k represents a project service life of the whole system, measured in years; r represents a discount rate; C(k) represents a cost in a k-th year, measured in RMB/year; $B_{salvage}$ represents salvage of the device, which is evaluated in the last year of an economic assessment life.

A calculation formula for C(k) is as follows:

$$C(k)=C_I(k)+C_R(k)+C_M(k)+C_F(k) \qquad (3)$$

Where, $C_I(k)$ represents initial investment in the k-th year, $C_R(k)$ represents renewal fees in the k-th year, $C_M(k)$ represents maintenance costs in the k-th year, and $C_F(k)$ represents fuel costs in the k-th year, all measured in RMB/year.

Calculation formulas for the variables are listed as follows:

$$C_I(k)=C_{Ibattery}+C_{Ipv}+C_{Iwind}+C_{IDG}+C_{IConverter} \qquad (4)$$

Where, $C_{Ibattery}$ represents investment for the energy storage battery, $C_{Ipv}$ represents investment for the photovoltaic array, $C_{Iwind}$ represents investment for the wind generators, $C_{IDG}$ represents investment for the diesel generator, and $C_{IConverter}$ represents investment for a converter for the energy storage battery, all in RMB. It should be noted that, the initial investment is generated only in the first year of the economic assessment life, and there is no initial investment in other years of the economic assessment life.

$$C_R(k)=C_{Rbattery}(k)+C_{Rpv}(k)+C_{Rwind}(k)+C_{RDG}(k)+C_{RConverter}(k) \qquad (5)$$

Where, $C_{Rbattery}(k)$ represents renewal fees of the energy storage battery in the k-th year, $C_{Rpv}(k)$ represents renewal fees of the photovoltaic array in the k-th year, $C_{Rwind}(k)$ represents renewal fees of the wind generators in the k-th year, $C_{RDG}(k)$ represents renewal fees of the diesel generators in the k-th year, and $C_{RConverter}(k)$ represents renewal fees of the converter for the energy storage battery in the k-th year, all measured in RMB.

$$C_M(k)=C_{Mbattery}(k)+C_{Mpv}(k)+C_{Mwind}(k)+C_{MDG}(k)+C_{MConverter}(k) \qquad (6)$$

Where, $C_{Mbattery}(k)$ represents maintenance costs for the energy storage battery in the k-th year, $C_{Mpv}(k)$ represents maintenance costs for the photovoltaic array in the k-th year, $C_{Mwind}(k)$ represents maintenance costs for the wind generators in the k-th year, $C_{MDG}(k)$ represents maintenance costs for the diesel generators in the k-th year, and $C_{MConverter}(k)$ represents the maintenance costs for the converter for the energy storage battery in the k-th year, all measured in RMB A mathematical expression of loss of capacity (LOC) of a load is:

$$f_2 = LOC = \frac{E_{cs}}{E_{tot}} \qquad (7)$$

Where, $E_{CS}$ represents total capacity shortage, $E_{tot}$ represents a total load capacity required, and LOC indicates a ratio of the capacity shortage to the total load capacity required.

A mathematical expression of an annual pollutant discharge level of the independent micro-grid system is:

$$f_3 = \sum_{k=1}^{K} (\sigma^{CO_2} + \sigma^{CO} + \sigma^{HC} + \sigma^{NO} + \sigma^{S})v^{fule}(k) \qquad (8)$$

Where, $\sigma^{CO_2}$ represents an emission coefficient of $CO_2$, $\sigma^{CO}$ represents an emission coefficient of CO, $\sigma^{HC}$ represents an emission coefficient of hydrocarbon HC, $\sigma^{NO}$ represents an emission coefficient of NO, and $\sigma^S$ represents an emission coefficient of S, all measured in kg/L; and $v^{fule}(k)$ represents an annual consumption amount of diesel-fuel consumed by the diesel generator in the k-th year, measured in liters.

The present value of a total cost during a total life cycle, the loss of capacity of a load, and the pollution level of the independent micro-grid system are calculated according to the above formulas.

Multi-objective solving is performed on the optimizing planning design model of the independent micro-grid by adopting an NSGA-II multi-objective genetic algorithm.

The solving by adopting the NSGA-II multi-objective genetic algorithm is as follows.

Firstly, system initialization is performed, i.e., parameters of devices in the independent micro-grid system and parameters for the genetic algorithm are read, a first generation parent population is generated by a random function, a fitness function value of each individual in the first generation of parent population is calculated by adopting a quasi-steady state simulation strategy, and a Pareto ranking operation is performed. In addition, a progeny population is obtained by performing selecting, crossover and mutation operations on the first generation parent population, a fitness function value of each individual in the progeny population is calculated by adopting the quasi-steady state simulation strategy; the progeny population is merged with the parent population to generate an intermediate population, Pareto ranking operation is performed, and a next generation parent population is selected and generated. At last, it is determined whether the number of iterations of the population meets a terminal condition. The determining whether the terminal condition is met may include: determining whether the number of iterations of the population reaches a preset number; and an optimization result is output if the number of iterations of the population reaches the preset number; otherwise, the above operations are repeated.

The parameters of the devices in the independent micro-grid system include types, technical parameters and economic parameters of the devices. Thus parameters necessary for the quasi-steady state simulation are obtained.

The parameters for the genetic algorithm mainly include a population size, the number of iterations, a crossover probability and a mutation probability.

According to the present disclosure, a set consisted of all the non-dominated solutions of the last generation population, i.e., a Pareto optimal solution set for the researched question, is obtained by the multi-objective genetic algorithm solving described above; a solution set consisted of objective functions corresponding to the non-dominated solutions, is a Pareto optimal boundary of the problem and is also the optimal solution set of the multi-objective problem according to an embodiment of the present disclosure.

During the optimal solution solving by using the NSGA-II multi-objective genetic algorithm, the adopted quasi-steady state simulation strategy includes a hard charging strategy and a power smooth strategy. By taking a simulation step in hours, quasi-steady state simulation in a total life cycle is performed on each device in the system, based on wind resources, light resources and a load requirement within a region where the independent micro-grid system is located. And based on a preset control strategy, i.e., the hard charging strategy and the power smooth strategy; the number and fuel consumption of the diesel generators in operation, a charging power and a discharging power and a residual capacity of the energy storage battery in each time step, and capacity shortage and a wasted power in the time step are determined; and thus the present value of the total cost during the total life cycle, the pollution discharging level and the loss of capacity of the load are calculated by the formulas described above.

In the hard charging strategy, the diesel generators 104 and the energy storage battery 103 alternately function as a main power supply for meeting a net load, and the diesel generators are permitted to charge the energy storage battery. Thereby operation time of the diesel generator group is reduced as much as possible, and the hard charging strategy is suitable for situations where renewable energy is rich and operation time of diesel generators is limited due to environmental or energy constraints.

The hard charging strategy includes the following steps.

A net load P1 of the independent micro-grid system is calculated. The net load P1 of the independent micro-grid system=load power−(power generated by the wind generator+power generated by the photovoltaic array).

The number of the diesel generators to be used in a present time step is determined; where the number of the diesel generators in operation is determined based on a net load P2 when considering the spare capacity, a start-up condition of diesel generators in a preceding time step and a maximum charging power and a maximum discharging power of the energy storage battery.

Capacity shortage Ecs (t) under a present load is calculated after the number of the diesel generators in operation in the present time step is determined.

After the number of the diesel generators in operation in the present time step is determined, indices such as actual fuel consumption of the diesel generators, a charging capacity and a discharging capacity of the energy storage battery, capacity shortage and wasted energy in the present time step are calculated based on the net load.

Figure 3:
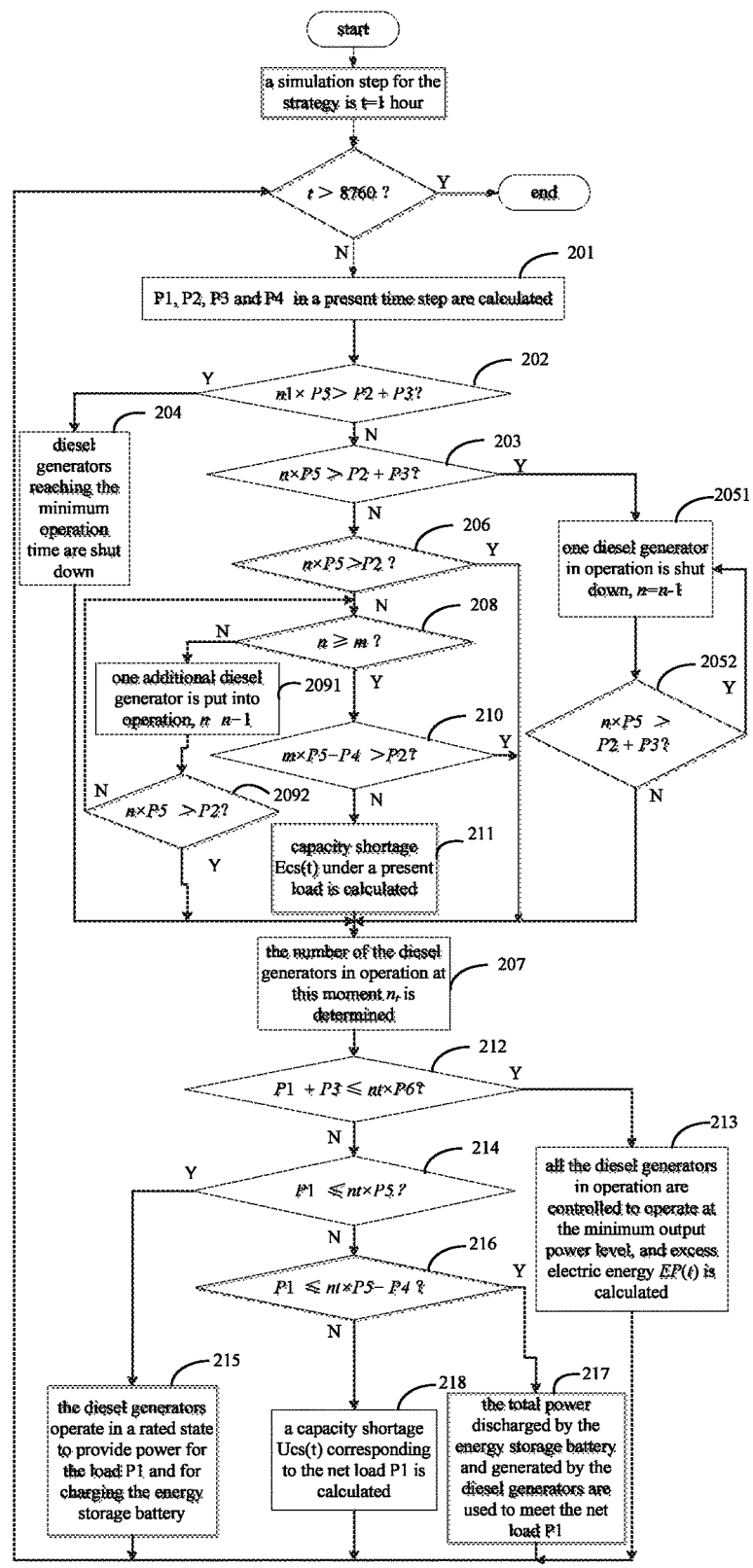
FIG. 3 is a control flowchart of a hard charging strategy according to an embodiment of the present disclosure.

Reference is made to FIG. 3, which shows a schematic flowchart of a hard charging strategy. The hard charging strategy includes steps 201 to 218 as follows.

A simulation step for the strategy is t=1 hour, and whether t is greater than 8760 hours (one year includes 8760 hours) is determined every time before the hard charging strategy is performed.

In step 201, a net load (P1) of the independent micro-grid system and a net load (P2) when considering a spare capacity are calculated, and a maximum charging power (P3) and a maximum discharging power (P4) of the energy storage battery are calculated.

In step 202, it is determined whether a total generation capacity of the diesel generators not reaching the minimum number of operation hours can meet a capacity for the net load (P2) when considering the spare capacity and for charging the energy storage battery; step 204 is performed if the total generation capacity of the diesel generators not reaching the minimum number of operation hours can meet a capacity for the net load (P2) when considering a spare capacity and for charging the energy storage battery; otherwise, step 203 is performed.

The net load when considering the spare capacity is P2=P1+δ, where δ is the spare capacity reserved for the independent micro-grid system, which helps stabilizing operation of the system.

In practice, suppose the total number of the diesel generators is m, the number of the diesel generators in operation at a preceding moment is n, and the number of the diesel generators not reaching the minimum number of operation hours in the current step is n1. A maximum output power of a diesel generator is P5, and a minimum output power of the diesel generator is P6.

Actually, it is determined whether n1×P5 is greater than P2+P3 in step 202.

In step 203, it is determined whether the total power of the diesel generators in operation at the preceding moment meets the power required for the net load when considering the spare capacity and for charging the energy storage battery; step 205 is performed if the total power of the diesel generators in operation at the preceding moment meets the power required for the net load when considering the spare capacity and for the charging requirement of the energy storage battery; otherwise, step 206 is performed.

Actually, it is determined whether n×P5 is greater than P2+P3 in step 203. If n×P5≤P2+P3, it indicates that the total power of the n diesel generators in operation at the preceding moment can not meet the power required for the net load (P2) when considering the spare capacity and for charging the energy storage battery; or if n×P5>P2+P3, it indicates that the total power of the n diesel generators in operation at the preceding moment can meet the power required for the net load (P2) of the spare capacity under consideration and for charging the energy storage battery.

In step 204, all the diesel generators reaching the minimum number of operation hours are permitted to stop operating; that is, the diesel generators reaching the minimum number of operation hours are shut down, and thus service lives of the diesel generators can be extended.

In step 205, operation of the diesel generators in operation are stopped one by one until capacity of the diesel generators in operation can just meet the capacity required for the net load (P2) when considering the spare capacity and for charging the energy storage battery.

The process of stopping the diesel generators in operation one by one includes steps 2051 to 2052 as follows.

In step 2051, one diesel generator in operation is shut down, and thus n=n−1.

In step 2052, it is determined whether a total power of the diesel generators currently in operation can meet the power required for the net load P2 when considering the spare capacity and for charging power P3 for the energy storage battery.

In step 206, it is determined whether the capacity of the diesel generators in operation meets the net load (P2) when considering the spare capacity; step 207 is performed, if the capacity of the diesel generators in operation meets the net load (P2) when considering the spare capacity; otherwise, step 208 is performed.

"the capacity of the diesel generators in operation meets the net load (P2) when considering the spare capacity" in step 206 means n×P5>P2, that is, the total power of the diesel generators in operation at the preceding moment can meet the net load P2 when considering the spare capacity. "the capacity of the diesel generators in operation can not meet the net load (P2) when considering the spare capacity" in step 206 means n×P5≤P2, that is, the total power of the diesel generators in operation at the preceding moment can not meet the net load P2 when considering the spare capacity.

In step 207, the number of the diesel generators in operation at this moment is determined.

The determined number of the diesel generators in operation at this moment is indicated as $n_t$.

In step 208, it is determined whether the number n of the diesel generators in operation at the preceding moment is greater than the total number m of the diesel generators; step 210 is performed, if the number n of the diesel generators in operation at the preceding moment is greater than the total number m of the diesel generators; otherwise, step 209 is performed.

Let n=n+1 if n<m; and both the energy storage battery and the diesel generators provide power for the load if n=m.

In step 2091, one additional diesel generator is put into operation, and thus n=n+1.

In step 2092, it is determined whether a total power of all the diesel generators in operation can meet the net load P2 when considering the spare capacity after the additional diesel generator is put in operation; step 207 is performed, if the total power of all the diesel generators in operation can meet the net load P2 when considering the spare capacity after the additional diesel generator is put in operation; otherwise, the procedure returns to step 208.

Actually, in step 2092, it is determined whether the total power of the diesel generators is greater than P2 after the additional diesel generator is put in operation in step 2091.

In step 210, it is determined whether a sum of a discharging power of the energy storage battery and the total power of the diesel generators is greater than P2; step 207 is performed if the sum of the discharging capacity of the energy storage battery and the total power of the diesel generators is greater than P2; otherwise, step 211 is performed.

Actually, in step 210, it is determined whether m×P5+P4 is greater than P2; step 207 is performed if m×P5+P4>P2; or capacity shortage Ecs(t) is calculated if m×P5+P4≤P2.

In step 211, capacity shortage Ecs(t) under a present load is calculated.

In step 212, after the number $n_t$ of diesel generators in operation in the present time step is determined in step 207, it is determined whether the all diesel generators in operation meet power required for the net load and for charging the energy storage battery if operating at a minimum output power level; step 213 is performed if the all diesel generators in use can meet the power required for net load and for charging the energy storage battery in case of operating at the minimum output power level; otherwise, step 214 is performed.

In step 213, all the diesel generators in operation are controlled to operate at the minimum output power level, and excess electric energy when all the diesel generators operate at the minimum output power level is calculated.

In step 214, it is determined whether power required for the net load P1 can be met in a case that all the diesel generators in operation are in a rated state (a maximum output power level); step 215 is performed if the power required for the net load P1 can be met when all the diesel generators in operation are in the rated state (the maximum output power level); otherwise, step 216 is performed.

In step 215, the diesel generators operate in a rated state to provide power for the load and for charging the energy storage battery.

In step 216, it is determined whether the total power discharged by the energy storage battery and generated by the diesel generators can meet power required for the net load P1; step 217 is performed if the total power discharged by the energy storage battery and generated by the diesel generators can meet power required for the net load P1; otherwise, step 218 is performed.

In step 217, the total power discharged by the energy storage battery and generated by the diesel generators are used to meet the net load P1.

In step 218, an actual capacity shortage Ucs(t) corresponding to the net load P1 is calculated.

According to the hard charging strategy according to the embodiment, a combined start-up mode of multiple diesel generators and a coordination control mode among the energy storage battery and the diesel generators are considered, so that the independent micro-grid system is more economical; the spare capacity is considered, so that the independent micro-grid system operates more stably; and the coordination control is performed among the energy storage battery and the diesel generators, operation time and output power state of the diesel generators are fully considered in operation of the diesel generators, so that the diesel generator operates in an economical range, and thereby the service lives of the diesel generators are extended.

Figure 4:
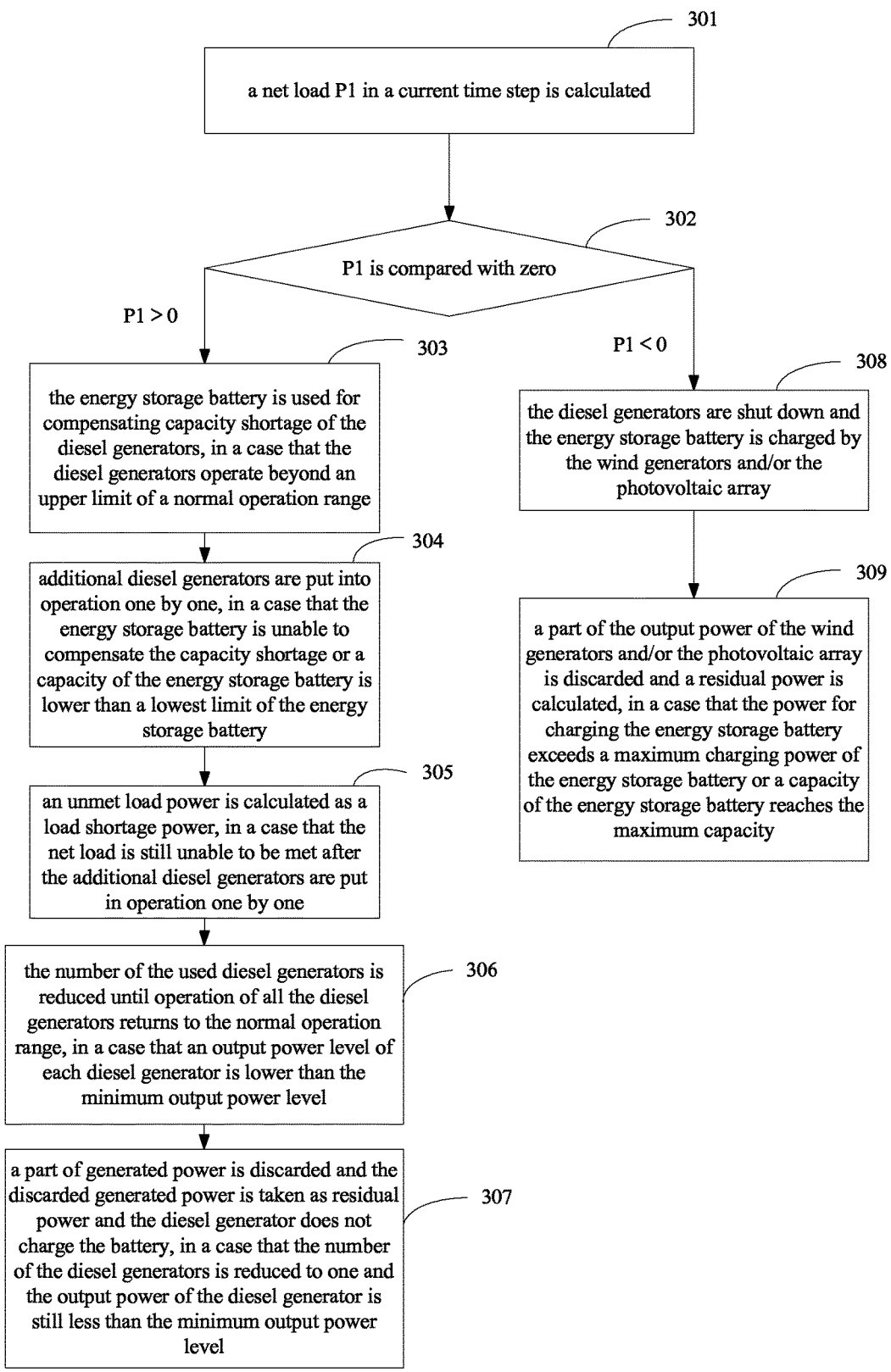
FIG. 4 is a control flowchart of a power smooth strategy according to an embodiment of the present disclosure.

Reference is made to FIG. 4, which shows a control flow of a power smooth strategy according to an embodiment of the present disclosure. The control flow includes steps 301 to 309 as follows.

In step 301, a net load P1 in a present time step is calculated.

In step 302, the net load is compared with zero.

In step 303, the energy storage battery is used for compensating capacity shortage of the diesel generators, in a case that the net load is greater than zero and the diesel generators operate beyond an upper limit of a normal operation range.

In step 304, additional diesel generators are put into operation one by one, in a case that the energy storage battery is unable to compensate the capacity shortage or a capacity of the energy storage battery is lower than a lowest limit of the energy storage battery.

The process of putting additional diesel generators in operation one by one in step 304 is the same as the process of putting additional diesel generators in operation one by on in the hard charging strategy, which is not repeated here.

In step 305, an unmet load power is calculated as a load shortage power, in a case that the net load is still unable to be met after the additional diesel generators are put in operation one by one.

In step 306, the number of the used diesel generators is reduced until operation of all the diesel generators returns to the normal operation range, in a case that the net load is greater than zero but an output power level of each diesel generator is lower than the minimum output power level.

In step 307, a part of generated power is discarded and the discarded generated power is taken as residual power and the diesel generator does not charge the battery, in a case that the number of the diesel generators is reduced to one and the output power of the diesel generator is still less than the minimum output power level.

In step 308, the diesel generators are shut down and the energy storage battery is charged by the wind generators and/or the photovoltaic array, in a case that the net load is less than zero.

In step 309, a part of the output power of the wind generators and/or the photovoltaic array is discarded and a residual power is calculated, in a case that the power for charging the energy storage battery exceeds a maximum charging power of the energy storage battery or a capacity of the energy storage battery reaches the maximum capacity.

With the power smooth strategy according to the embodiment, a capacity requirement for the energy storage battery is relatively less restrict. The energy storage battery merely functions as a supplementary power supply in addition to the diesel generators and discharges in a case that the diesel generators are unable to meet the load. The energy storage battery is mainly used to meet the part of load requirement not met by the diesel generators and absorb excess energy of renewable energy resources.

The described above are merely a few particular embodiments of the present disclosure. It should be noted that, for those skilled in the art, modifications and adjustments may also be made without departing from the principles of the disclosure. These modifications and adjustments should also fall in the scope of protection of the present disclosure.

The invention claimed is:

1. A method for optimizing an independent micro-grid system, wherein the independent micro-grid system comprises at least diesel generators, wind generators, a photovoltaic array and an energy storage battery, and the method comprises executing on a processor of a computer system the steps of:
obtaining, by a parameter acquiring device of the computer system, device parameters of the diesel generators, the wind generators, the photovoltaic array and the energy storage battery; and
performing, by an optimizing device of the computer system, genetic algorithm solving and optimization by adopting a multi-objective genetic algorithm based on the device parameters of the diesel generators, the wind generators, the photovoltaic array and the energy storage battery, wherein:
a quasi-steady state simulation strategy is adopted by the computer system into a calculating device executed by the processor, a preset spare capacity is reserved for the independent micro-grid system,
optimization indices of the independent micro-grid system are obtained by an optimization indices acquiring device, and
an optimization result is obtained by an optimization result acquiring device of the computer system by using the multi-objective genetic algorithm,
optimizing, by the optimizing device of the computer system, the independent micro-grid system based on the optimization result: and wherein:
the optimization indices of the independent micro-grid system comprise a present value of a total cost during a total life cycle, a loss of capacity of a load, and a pollution level; wherein the present value of the total cost during the total life cycle comprises present values of costs of all the devices in the independent micro-grid system during a whole project service life and present values of salvages of all the devices in the independent micro-grid system; the loss of capacity of a load is a ratio of capacity shortage to a whole load capacity required; and the pollution level is an annual amount of various pollutants discharged;
the quasi-steady state simulation strategy comprises a hard charging strategy and a power smooth strategy, wherein in the hard charging strategy, the diesel generators and the energy storage battery alternately function as a main power supply for meeting a requirement of a net load, and the diesel generators are permitted to charge the energy storage battery; and in the power smooth strategy, the energy storage battery merely functions as a supplementary power supply and discharges when the diesel generators alone are unable to meet the requirement of the load; and
the hard charging strategy comprises:
calculating, by the calculating device executed by the processor, a net load of the independent micro-grid system and a net load when considering the spare capacity, wherein the net load is obtained by subtracting powers generated by the wind generators and the photovoltaic array from the load power;
determining, by a determining device executed by the processor, the number of the diesel generators in operation in a present time step and calculating capacity shortage under a present load, according to the net load when considering the spare capacity, a start-up conditions of the diesel generators in a preceding time step and a maximum charging power and a maximum discharging power of the energy storage battery; and
after the number of the diesel generators in operation in the present time step is determined, calculating, by the calculating device executed by the processor, actual fuel consumption of the diesel generators, a charging capacity and a discharging capacity of the energy storage battery, capacity shortage and a wasted energy in the present time step, based on the net load.

2. The method according to claim 1, wherein the determining, by the determining device executed by the processor, the number of the diesel generators in operation in a present time step and calculating capacity shortage under a present load comprises:

permitting all the diesel generators reaching a minimum operation time requirement to stop operating, in a case that a total power of the diesel generators not reaching a minimum number of operation hours is able to meet power required for the net load when considering the spare capacity and for charging the energy storage battery; otherwise, stopping operation of the diesel generators reaching the minimum operation time requirement one by one until the diesel generators in use are just able to meet the net load when considering the spare capacity and the charging requirement of the energy storage battery;

putting more diesel generators one by one into operation, in a case that the total power of the diesel generators not reaching the minimum number of operation hours is unable to meet the net load when considering the spare capacity and the charging requirement of the energy storage battery, and a total power of the operating diesel generators is unable to meet power required for the net load when considering the spare capacity and for charging the energy storage battery, wherein the additional diesel generators put in use do not charge the energy storage battery;

calculating capacity shortage if any, wherein the capacity shortage is a capacity of the net load when considering the spare capacity that is still unmet by a total power of all the diesel generators in operation after the additional diesel generators are put in operation one by one;

compensating the capacity shortage by a power discharged by the energy storage battery; and calculating the capacity shortage under the present load and thereby calculating the loss of capacity of the load, in a case that a sum of the power discharged by the energy storage battery and a total power of all the diesel generators is still unable to meet the net load when considering the spare capacity.

3. The method according to claim 1, wherein after the number of the diesel generators in operation in the present time step is determined, besides the calculating, by the calculating device executed by the processor, actual fuel consumption of the diesel generators, a charging capacity and a discharging capacity of the energy storage battery, capacity shortage and a wasted energy in the present time step, the method further comprises:

determining whether the all diesel generators in operation meet power required for the net load and for charging requirement of the energy storage battery if all the generators operate at a minimum output power level; if yes, keeping all the diesel generators in operation operating at the minimum output power level and calculating excess electric energy when the all diesel generators operate at the minimum output power level; if no, determining, based on the net load and the charging requirement of the energy storage battery, a total output power level of the all diesel generators;

permitting the energy storage battery to discharge and, together with the diesel generators, provide power to the load, in a case that all the diesel generators in rated operation are still unable to meet the net load; and calculating actual capacity shortage under a present load, in a case that after the energy storage battery discharges, a sum of the power discharged by the energy storage battery and the total power of the diesel generators are still unable to meet the net load.

4. The method according to claim 1, wherein the power smooth strategy comprises:

calculating a net load in a present time step, wherein the net load is obtained by subtracting powers generated by the wind generators and the photovoltaic array from a load power;

using first the energy storage battery to compensate a capacity shortage that is not met by the diesel generators, in a case that the net load is greater than zero and the diesel generators operate beyond an upper limit of a normal operation range;

putting additional diesel generators in operation one by one, in a case that the energy storage battery is unable to meet the capacity shortage or a capacity of the energy storage battery is lower than a lowest limit capacity of the energy storage battery;

calculating an unmet load power as a load shortage power, in a case that the net load is still unable to be met after the additional diesel generators are put in operation one by one;

in a case that the net load is greater than zero and an output power level of each diesel generator is less than a minimum output power level, reducing the number of the diesel generators in operation until operation of all the diesel generators returns to the normal operation range; in a case that the number of the diesel generators is reduced to one and the output power of the diesel generator is still less than the minimum output power level, discarding a part of generated power and taking the discarded generated power as a residual power, wherein the diesel generator do not charge the battery; and shutting down the diesel generators and charging the energy storage battery by the wind generators and/or the photovoltaic array, in a case that the net load is less than zero; and discarding a part of the output power of the wind generator and/or the photovoltaic array and calculating a residual power, in a case that a power for charging the energy storage battery exceeds a maximum charging power of the energy storage battery or the capacity of the energy storage battery reaches a maximum capacity.

5. The method according to claim 1, wherein the reserving a preset spare capacity for the independent micro-grid system comprises: in an optimizing planning design model of the independent micro-grid system, using the diesel generators and the energy storage battery as main power supplies to maintain a voltage and a frequency stable, and reserving a preset spare capacity according to actual powers of the wind generators, the photovoltaic array and the load in real time.

6. The method according to claim 1, wherein an NSGA-II multi-objective genetic algorithm is adopted during the genetic algorithm solving, and types of the wind generators, the number of the wind generators, types of the diesel generators, the number of the diesel generators, a capacity of the photovoltaic array, a type of the energy storage battery, the number of parallel branches of the energy storage battery, and a capacity of a bidirectional converter of the energy storage battery in the independent micro-grid system are selected as optimization variables.

7. The method according to claim 1, wherein the obtaining a present value of a total cost during a total life cycle, a loss of capacity of a load, and a pollution level of the independent micro-grid system comprises:

by taking a simulation step in hours, performing quasi-steady state simulation during the total life cycle on each device in the independent micro-grid system, based on wind resources, light resources and a load requirement within a region where the independent micro-grid system is located; determining, based on a preset control strategy, the number and fuel consumption of the diesel generators in operation, a charging power, a discharging power and a residual capacity of the energy storage battery in each time step, and capacity shortage and a wasted power in the time step; and calculating a present value of a total cost during a total life cycle, a loss of capacity of a load, and a pollution level.

* * * * *